(12) United States Patent
Hersey

(10) Patent No.: US 9,283,677 B2
(45) Date of Patent: Mar. 15, 2016

(54) VISUAL INDICATION OF TARGET TRACKING

(75) Inventor: Stephen Hersey, Waltham, MA (US)

(73) Assignee: Rethink Robotics, Inc., Boston, MA (US)

( * ) Notice: Subject to any disclaimer, the term of this patent is extended or adjusted under 35 U.S.C. 154(b) by 1015 days.

(21) Appl. No.: 13/440,653

(22) Filed: Apr. 5, 2012

(65) Prior Publication Data
US 2013/0265854 A1 Oct. 10, 2013

(51) Int. Cl.
*B25J 9/16* (2006.01)
*B25J 19/02* (2006.01)
*G01S 7/64* (2006.01)
*G01S 15/52* (2006.01)
*G01S 15/66* (2006.01)

(52) U.S. Cl.
CPC ............ *B25J 9/1676* (2013.01); *B25J 19/026* (2013.01); *G01S 7/64* (2013.01); *G01S 15/523* (2013.01); *G01S 15/66* (2013.01); *G05B 2219/40203* (2013.01)

(58) Field of Classification Search
CPC .................. B25J 19/026; B25J 9/1676; G05B 2219/40203; G01S 7/536; G01S 7/64; G01S 15/526; G01S 15/66; G01S 15/523; G01D 11/14
See application file for complete search history.

(56) References Cited

U.S. PATENT DOCUMENTS 3,967,283 A 6/1976 Clark et al.
4,107,659 A 8/1978 Massa
4,197,528 A 4/1980 Gibson
4,240,152 A 12/1980 Duncan et al.
4,240,281 A 12/1980 Lather et al.
4,264,788 A 4/1981 Keidel et al.
4,349,897 A 9/1982 Boehme et al.
4,490,716 A 12/1984 Tsuda et al.
4,628,496 A 12/1986 Lee
4,821,192 A 4/1989 Taivalkoski et al.
4,991,146 A 2/1991 Ransdell et al.
5,319,611 A 6/1994 Korba
5,437,178 A 8/1995 Esin et al.
5,447,051 A 9/1995 Hanks et al.
5,517,994 A 5/1996 Burke et al.
5,638,824 A 6/1997 Summers (Continued)

FOREIGN PATENT DOCUMENTS

CN 1215153 A 4/1999
CN 104349874 A 2/2015

(Continued)

OTHER PUBLICATIONS

International Search Report and Written Opinion mailed Jul. 25, 2013 for International Application No. PCT/US2013/035376 (11 pages).

(Continued)

*Primary Examiner* — Luke Ratcliffe
*Assistant Examiner* — Hovhannes Baghdasaryan
(74) *Attorney, Agent, or Firm* — Morgan, Lewis & Bockius LLP

(57) ABSTRACT

Awareness of a device, such as a robot, to proximate humans (or other moving object) is manifested by a visual signal aligned with—i.e., aimed at—the human. For example, an illumination system may take the form of a closed or partial ring around which lighting elements may be selectively activated.

17 Claims, 9 Drawing Sheets

(56) References Cited

U.S. PATENT DOCUMENTS

| | | |
|---|---|---|
| 5,640,143 A | 6/1997 | Myron et al. |
| 5,663,503 A | 9/1997 | Dam et al. |
| 5,689,250 A | 11/1997 | Kremser |
| 5,793,704 A | 8/1998 | Freger |
| 6,248,068 B1 | 6/2001 | Seabron |
| 6,331,964 B1 | 12/2001 | Barone |
| 6,445,988 B1 | 9/2002 | Breed et al. |
| 6,568,270 B2 | 5/2003 | Hongerholt |
| 6,885,300 B1 | 4/2005 | Johnston et al. |
| 7,027,355 B2 | 4/2006 | Baldwin et al. |
| 7,050,798 B2 | 5/2006 | Ranta |
| 7,504,989 B2 | 3/2009 | Tsuchihashi et al. |
| 7,679,996 B2 | 3/2010 | Gross |
| 7,690,261 B2 | 4/2010 | Tanaka |
| 7,821,870 B2 | 10/2010 | Ramakrishnan |
| 8,842,495 B2 | 9/2014 | Hersey |
| 2004/0243015 A1 | 12/2004 | Smith et al. |
| 2007/0074571 A1 | 4/2007 | Haynes et al. |
| 2008/0015440 A1 | 1/2008 | Shandas et al. |
| 2008/0205194 A1 | 8/2008 | Chiappetta et al. |
| 2009/0001226 A1 | 1/2009 | Haygood |
| 2009/0145232 A1 | 6/2009 | Suginouchi et al. |
| 2010/0023195 A1 | 1/2010 | Traster |
| 2010/0052571 A1* | 3/2010 | Murakami et al. ............ 315/297 |
| 2010/0134321 A1 | 6/2010 | Kim |
| 2010/0270091 A1 | 10/2010 | Ding |
| 2010/0321184 A1 | 12/2010 | Dreuillet et al. |
| 2011/0120209 A1 | 5/2011 | Rose et al. |
| 2012/0039152 A1 | 2/2012 | Humphrey et al. |
| 2013/0077442 A1 | 3/2013 | Hersey |
| 2013/0283916 A1 | 10/2013 | Hersey et al. |
| 2013/0286783 A1 | 10/2013 | Sussman et al. |

FOREIGN PATENT DOCUMENTS

| | | |
|---|---|---|
| DE | 3149256 A1 | 6/1983 |
| EP | 0026385 A1 | 4/1981 |
| EP | 0814344 A2 | 12/1997 |
| EP | 0945725 A1 | 9/1999 |
| EP | 1408276 A2 | 4/2004 |
| EP | 2160078 A1 | 3/2010 |
| EP | 2834049 A1 | 2/2015 |
| JP | 63193085 A | 8/1988 |
| JP | 63311192 A | 12/1988 |
| JP | 1012284 A | 1/1989 |
| JP | 3277987 A | 12/1991 |
| JP | 5215850 A | 8/1993 |
| JP | 2000028358 A | 1/2000 |
| JP | 2004122313 A | 4/2004 |
| WO | 93/19385 A1 | 9/1993 |
| WO | WO-2009067765 A1 | 6/2009 |
| WO | 2013/044035 A1 | 3/2013 |
| WO | 2013/152258 A | 10/2013 |

OTHER PUBLICATIONS

International Application Serial No. PCT/US2012/056585, International Preliminary Report on Patentability mailed on Apr. 3, 2014, 8 pages.

International Application Serial No. PCT/US2012/056585, International Search Report mailed on Dec. 14, 2012, 4 pages.

PCT International Patent Application No. PCT/US2013/035376, International Preliminary Report on Patentability mailed Oct. 16, 2014, 9 pages.

* cited by examiner

VISUAL INDICATION OF TARGET TRACKING

TECHNICAL FIELD

In various embodiments, the present invention relates generally to motion detection in automated industrial systems, and more particularly to visual indications incident to motion tracking.

BACKGROUND

Automated industrial systems, e.g., autonomous robots, have been developed to be more self-sufficient since the emergence of the first manufactured robots over half a century ago. Unlike the earliest robots, contemporary devices require less human assistance; they are capable of independently functioning and completing tasks in various types of unstructured environments. However, bringing robots and humans into spatial proximity leads to the fundamental concern of how to ensure safety for the human. A heavy industrial robot with powerful actuators and unpredictably complex behavior can cause harm, for instance, by stepping on a human's foot or falling on him. Therefore, detecting the presence of moving objects in the vicinity of robots is crucial for ensuring the safety of people working near the robotic system.

One approach is to equip the robot with motion-detection capabilities. Various motion-detecting technologies exist, including passive infrared detectors (PIRs), Doppler microwave sensors, ultrasonic rangefinders, scanned laser rangefinders, vision-based systems, pressure-sensitive mats, and arrays of infrared emitter/detector pairs, which are known as "light curtains." U.S. Ser. No. 13/243,253, entitled Ultrasonic Motion Detection and filed on Sep. 23, 2011 (the entire disclosure of which is incorporated herein by reference), describes systems and methods for adaptively detecting the real-time approximate range and bearing of moving objects utilizing ultrasound. In various embodiments, an ultrasound transducer comprises multiple ultrasound transducer elements. This arrangement permits detection with a full 360° field of view and is capable of detecting multiple moving objects at different distance ranges with different velocities in real time, while ignoring the presence of immobile objects as a static background. Systems in accordance with the '253 application can reliably detect the range and bearing of one or more moving objects, while ignoring stationary objects in the vicinity of, e.g., an autonomous robot, thereby protecting humans in the working environment.

Although a robot equipped with this type of presence-detection system can register the proximity of people and take appropriate safety measures, the people themselves do not know whether the robot is aware of them and will adapt its behavior accordingly. Individuals may be hesitant to approach the robot, which limits their ability to train the robot and participate in tasks that the robot carries out; this, in turn, limits robotic design, since robots must be configured to adapt and learn without the expectation of robust and routine interaction with humans.

Alerting individuals to a robot's awareness of their presence represents a challenging problem. Audible detection indicators are unsuitable for use in a noisy industrial environment, and cannot provide location-specific feedback to multiple persons, while a display screen visually indicating the objects detected by the robot cannot provide an immediate, unambiguous, location-specific indication of detection in a work environment that may extend 360° around the robot: display screens are difficult to read from a distance beyond the robot's action radius and have limited view angles. Screen displays are also costly both economically and in terms of computational overhead. Indeed, in an industrial environment filled with automated equipment having display screens, individuals passing by the robot may ignore the content of its display screen as irrelevant unless they intend to operate it.

SUMMARY

In various embodiments, the present invention indicates its awareness of a proximate human (or other moving object) by providing a visual signal aligned with—i.e., aimed at—the human. For example, an illumination system may take the form of a closed or partial ring around which lighting elements may be selectively activated. A controller, responsive to the tracked location of one or more moving objects, may selectively activate one or more lighting elements so as to provide a visual tracking signal continually (and separately) visible to each moving target and varying with the tracked location. In this way, individuals moving within the robot's tracking zone observe a signal visually corresponding to their locations, unambiguously indicating that they have been detected by the robot.

Accordingly, in one aspect, the invention relates to a method for providing a visual tracking indication to a tracked target. In various embodiments, the method comprises tracking, by a tracking device, a location of a target object moving within a defined space; and, responsive to the tracked location, providing a visual tracking signal continually visible to the moving target within the space and varying with the tracked location; the signal visually indicates the tracked location relative to the tracking device. In some embodiments the field covers at least 180° relative to the tracking device—e.g., 180°, 270° or 360°, or an intermediate angular region. The visual tracking signal may be provided by an arcuate illumination device having an angularly variable illumination output confined to a variable arcuate region continuously aligned with the tracked target.

In some embodiments, the arcuate illumination device has a closed ring configuration, and the arcuate regions of available illumination extend fully around the ring. The illumination device may include or consist of a plurality of individually actuable segments, which may be variably actuated as the target moves to maintain the alignment. Some embodiments of the invention can track and signal more than one moving target. For example, the method may comprise tracking, by the tracking device, a location of a second target object moving within the defined space; and, responsive to the tracked location of the second target object, providing a second visual tracking signal continually visible to the moving second target object within the space and varying with the tracked location of the second target object; the second signal visually indicates the tracked location of the second target object relative to the tracking device.

In another aspect, the invention pertains to a system for tracking movement. In various embodiments, the system comprises a tracking system for tracking a location of a target object moving within a defined space; an illumination device having an arcuate profile and an angularly variable illumination output; and an illumination controller, responsive to the tracking system, for controlling the illumination device to provide a visual tracking signal continually visible to the moving target within the space and varying with the tracked location; the signal visually indicates the tracked location relative to the tracking device.

The tracking system may, for example, comprise or consist of an ultrasound transducer comprising a plurality of transducer elements, where each element emits and receives ultrasound with a spatial zone defined by a solid angle; drive circuitry coupled to the transducer elements; and an ultrasound controller for controlling ultrasound waves emitted from the transducer elements and determining movements of objects based thereon. The illumination controller causes the illumination device to output light to the spatial zone in which the target is located. In some embodiments, the illumination device comprises a plurality of individually actuable segments each corresponding to one of the spatial zones; the segments may be variably actuated as the target moves so that at least the segment corresponding to the spatial zone in which the target is instantaneously located is lit. For example, the transducer elements and the illumination segments may be arranged in a ring or a partial ring, with a field covering at least 180° (e.g., 180°, 270° or 360°, or an intermediate angular region) relative to the tracking device.

The illumination device may have an angularly variable illumination output, and the controller may be configured to cause the visual signal to be confined to a variable arcuate region continuously aligned with the tracked target. Thus, if the illumination device has a closed ring configuration, the angularly variable illumination output may extend fully around the ring. In some embodiments, the illumination device comprises a plurality of individually actuable segments, and the controller variably actuates the segments as the target moves to maintain the alignment.

Some embodiments of the invention can track and signal more than one moving target. For example, the tracking system may be configured to track a location of a second target object moving within the defined space; and the illumination controller may be responsive to the tracked location of the second target object and control the illumination device to provide a second visual tracking signal continually visible to the moving second target object within the space and varying with the tracked location of the second target object; the second signal visually indicates the tracked location of the second target object relative to the tracking device.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology. Furthermore, the term "substantially" means ±10%, and in some embodiments, ±5%.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

The following discussion describes a representative system for providing presence-detection signals implemented in conjunction with a sonar-based tracking system, which supplies the necessary presence information. It should be understood, however, that presence-detection systems and methods as described herein may be employed with any approach to locating and tracking moving objects within an environment. Such approaches may involve ultrasound, as described herein or as known in other ranging systems, or entirely different (e.g., PIRs, Doppler microwave sensors, scanned laser rangefinders, vision-based systems, pressure-sensitive mats, and light curtains, to name a few).

Figure 1A:
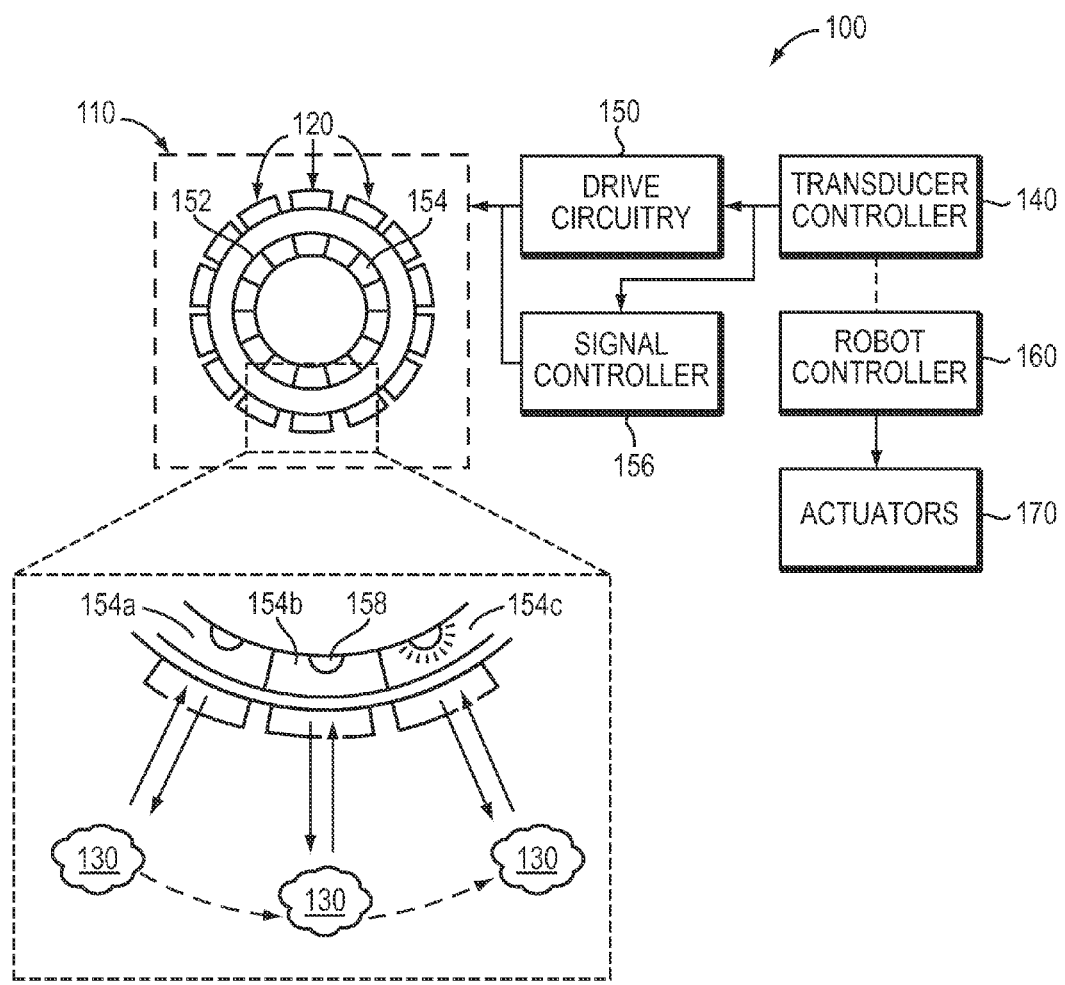
FIG. 1A schematically depicts an exemplary tracking and detection-indicating system in accordance with embodiments hereof.

FIG. 1A depicts an exemplary ultrasound-based ranging system implemented in conjunction with a presence-detection system. The overall system 100 includes an ultrasound transducer 110 having multiple transducer elements 120. Each transducer element 120 emits directional ultrasound waves or pulses towards an object 130 (e.g., humans or equipment) as it moves, and receives the reflected waves therefrom. The elapsed time between an ultrasound wave emission and the reception of a reflected wave can be used to determine the distance between the ultrasound emitter and the object causing the reflection. A transducer controller 140 regulates several aspects of the emitted ultrasound signals, e.g., frequency, phase, and amplitude, by controlling the transducer elements via the associated drive circuitry 150 (which sends signals to the transducer elements 120). In addition, the controller 140 analyzes the nearby spatial arrangements of the transducer based on the reflected signals as described in greater detail below.

In one embodiment, each transducer element 120 is associated with a separate controller 140 and/or drive circuitry 150. The controllers and drive circuitry may use identical signal-processing circuits and have the same electrical and acoustic characteristics. In another embodiment, some or all of the transducer elements 120 are regulated by a single controller and drive circuitry. A circular illumination array 152, typically arranged parallel to (e.g., above or below) the transducer array 110, includes a series of segmented, adjacent illumination elements 154, each of which may be separately activated by a signal controller 156. The signal controller 156 receives tracking location information from the transducer controller 140 and activates the appropriate one (or more) of the segments 154 so that the light signal emanating therefrom is aimed at the tracked object. As shown in FIG. 1A, when the tracked object 130 reaches the rightmost illustrated position, only segment 154c is lit; the other segments are turned off.

Figure 1B:
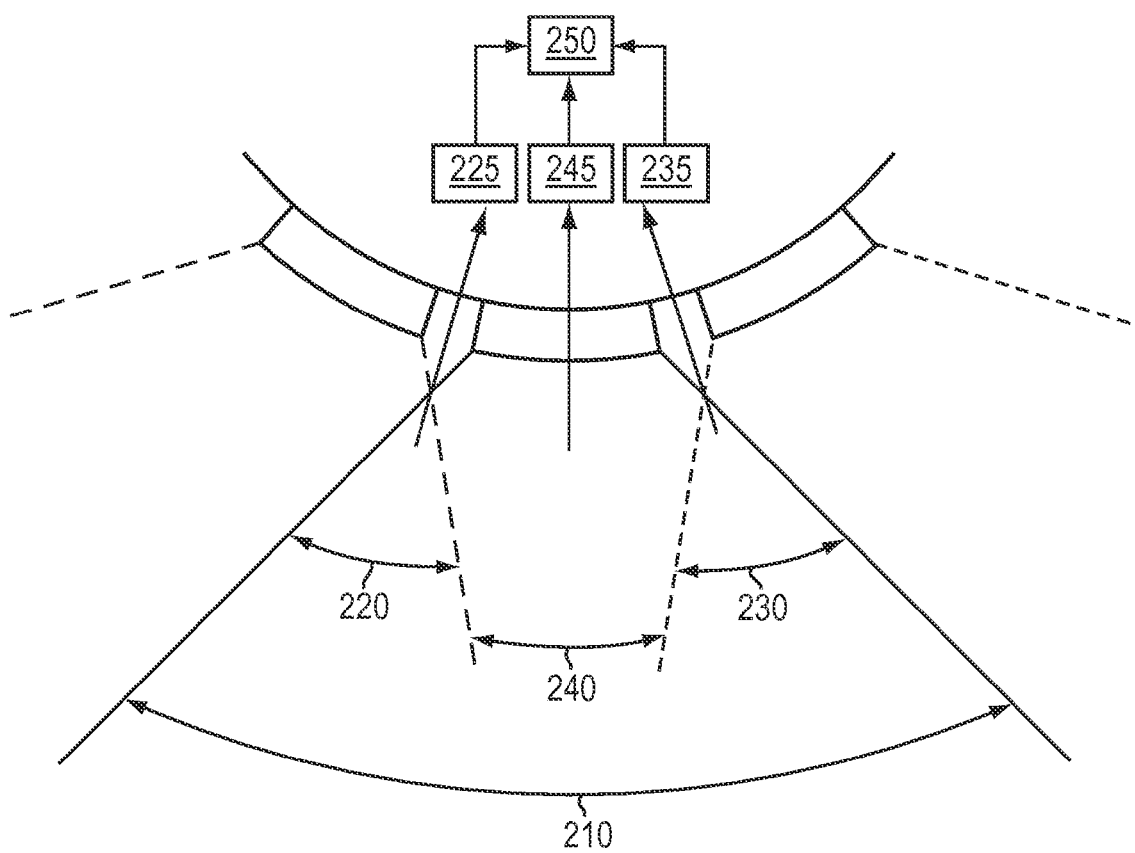
FIG. 1B depicts ultrasound transducer elements emitting and receiving ultrasound within a spatial zone defined by a solid detection angle.

In various embodiments, the transducer elements 120 are arranged in a cluster and/or a ring with the fields of view extending outward from a single location in a common horizontal plane. Each element 120 emits and receives ultrasound within a spatial zone defined by a solid detection angle, as depicted in FIG. 1B. The transducer thus has a detection angle with a full 360 degree field of view. Within the solid detection angle of each transducer element (e.g., the angle 210), a portion of the angle may overlap with the detection angles of other elements (e.g., the angles 220, 230). Information from the ultrasound waves transmitted in the non-overlapped region 240 and the overlapped areas 220 and 230 is delivered and stored in the memory 250. This implementation ensures the detection of movements of every object in the space, even at the boundaries of two adjacent transducer elements.

The transducer controller 140 may follow multiple tracked objects, and the signal controller 156, in turn, may separately illuminate different segments 154 aligned with each object, varying the illuminated segments as the objects move so that, for example, only a single segment is illuminated for each tracked object. In some embodiments, each of the transducer elements 120 is associated with a single lighting segment 154; for example, an indicator can be located above each transducer element, or alternatively, an indicator can be disposed between each pair of adjacent transducer elements. Such arrangements are illustrative only, however. More generally, the illumination array 152 may have any one- or two-dimensional pattern of lighting elements 158, and these need not be divided into segments; rather, each lighting element 158 or group thereof may be addressed individually by the signal controller 156. The lighting elements 158 may be light-emitting diodes (LEDs), incandescent lightbulbs, or any other suitable electronically actuable illumination source. The signal controller 156 includes a switch matrix and suitable programming for responsively activating the appropriate lighting elements 158.

It should also be stressed that the ring configuration of illumination array 152 is illustrative only. Preferably, the illumination array operates over the spatial field addressed by the transducer 110, and so may be an arcuate ring portion rather than a closed ring. Indeed, if the transducer 110 is configured (e.g., in the form of a dome) to sense out-of-plane objects, the illumination array 152 may have illumination elements 158 distributed over a hemispherical surface.

Furthermore, the pattern of illumination can vary. When the transducer elements 120 are arranged in a circular ring with the visual indicators 158 located between adjacent transducer elements, the indicators on both sides of a given channel may be illuminated when that channel detects an object; this can improve the visibility and effectiveness of the indicators. In this variation, a given indicator 158 is illuminated when either of the two detector elements it is located between has detected an object. If a single channel detects an object, the two adjacent indicators are illuminated; if two adjacent channels detect objects, the three indicators between and on either side of these detector elements are illuminated.

In various embodiments the controllers 140, 156 may be provided as either software, hardware, or some combination thereof, and as separate logical or physical systems or a single system. For example, the either or both controllers may be implemented on one or more server-class computers, such as a PC having a CPU board containing one or more processors such as the Core Pentium or Celeron family of processors manufactured by Intel Corporation of Santa Clara, Calif. and POWER PC family of processors manufactured by Motorola Corporation of Schaumburg, Ill., and/or the ATHLON line of processors manufactured by Advanced Micro Devices, Inc., of Sunnyvale, Calif. The controllers may contain a processor that includes a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD). In some embodiments, the programs may be provided using external RAM and/or ROM such as optical disks, magnetic disks, as well as other commonly used storage devices.

For embodiments in which one or more of the controllers 140, 156 are provided as a software program, the program may be written in any one of a number of high level languages such as FORTRAN, PASCAL, JAVA, C, C++, C#, LISP, PERL, BASIC, PYTHON or any suitable programming language. Additionally, the software can be implemented in an assembly language and/or machine language directed to the microprocessor resident on a target device.

The illustrated targeting and signaling systems may advantageously be deployed on an industrial robot. In general, an industrial robot is an automatically controlled, reprogrammable, multipurpose manipulator programmable in three or more axes. Most robots include robotic arms and/or manipulators that operate within a working envelope, and whose movements are driven by actuators operated by a robot controller; see, e.g., U.S. Pat. No. 5,650,704 and U.S. Ser. No. 12/843,540, filed on Jul. 26, 2010, and Ser. No. 13/159,047, filed on Jun. 13, 2011, the entire disclosures of which are hereby incorporated by reference. Thus, as illustrated, a robot controller 160 may control the kinematics of a robot, including movements of manipulators and appendages, by signals sent to actuators 170 in a manner well-known to those skilled in the art. Here, the controller 160 is responsive to signals from transducer controller 140. For example, when the transducer controller 140 detects a moving object in proximity to the robot's working envelope, it signals robot controller 160 which, in turn, disables all or the relevant actuators 170 whose operation might cause danger to the detected moving object. Of course, the controllers 140, 160 need not be separate entities, but may instead be implemented within a single overall system controller.

Figure 2:
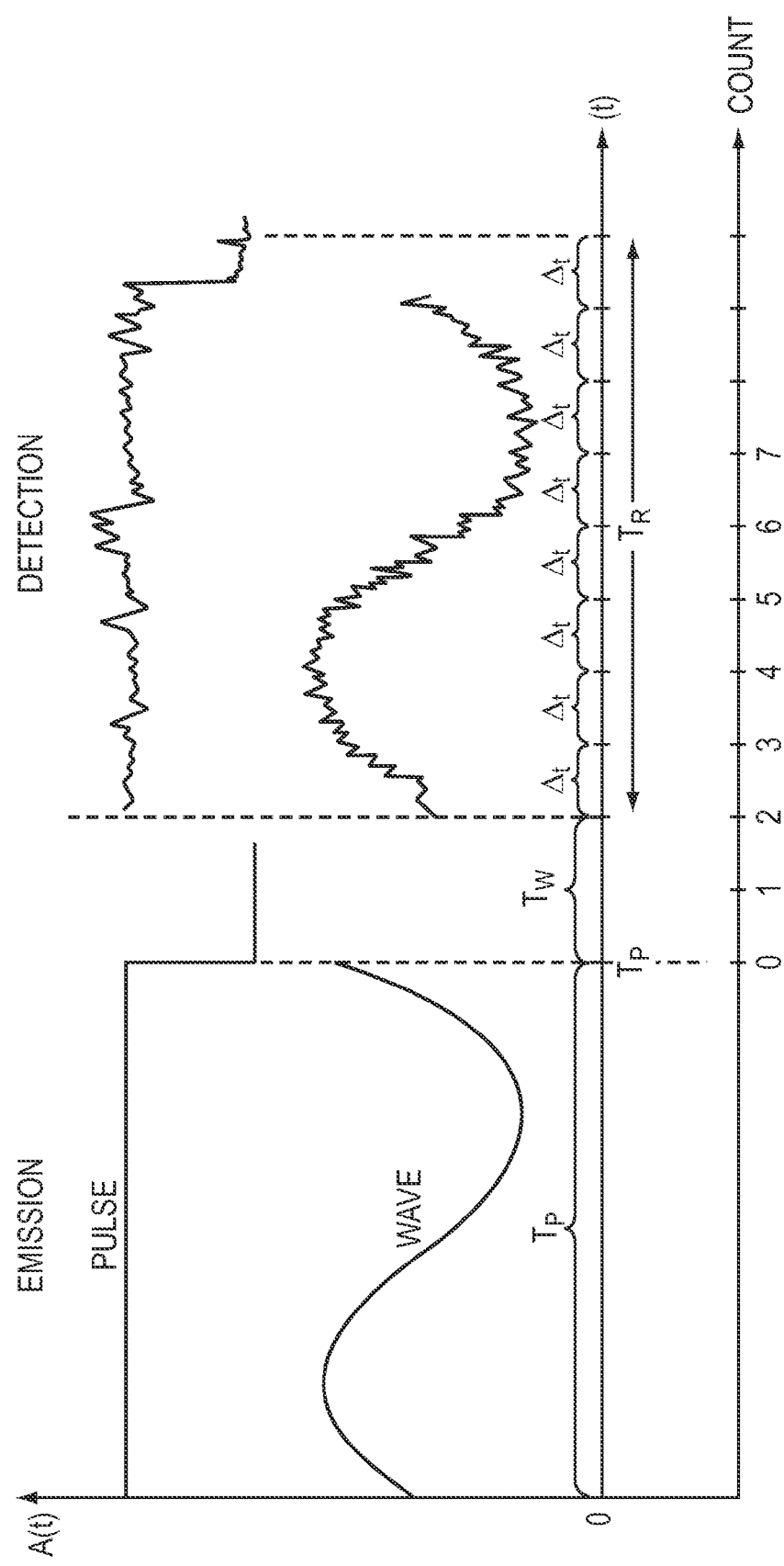
FIG. 2 depicts ultrasound waves or pulses emitted into a space and detected as reflections from objects in the space.
Figure 3:
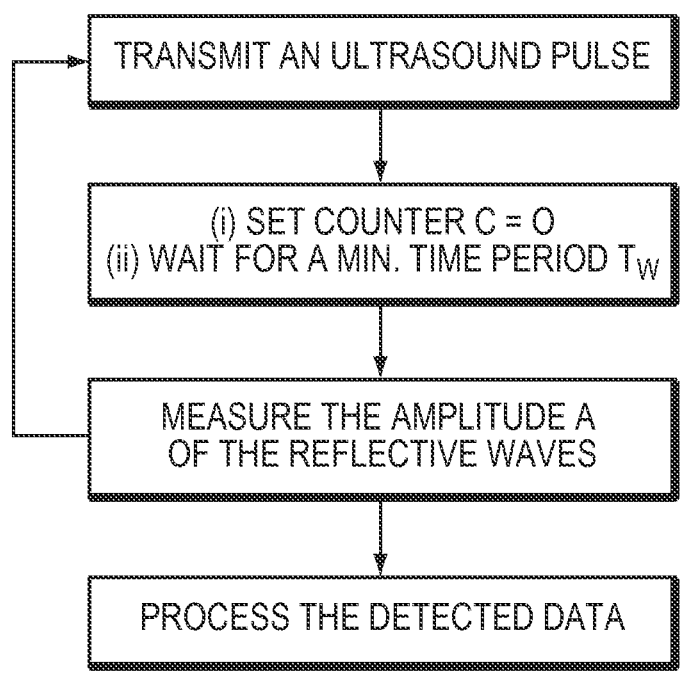
FIG. 3 illustrates an iterative process for detecting moving objects.

Referring to FIG. 2, in various embodiments, each transducer element emits an ultrasound wave (or pulse) having a duration of $T_P$ within a spatial zone. The ultrasound waves (or pulses) may be emitted sequentially or simultaneously across zones. At the end of the wave (or pulse) signal, the transducer controller sets a counter C to zero counts. Throughout the detection procedure, the counter C increases at a fixed time interval $\Delta t$, the magnitude of which is determined based on a convenient unit of spatial resolution. For example, for a spatial resolution of 1 centimeter, $\Delta t$ may be set to 58 μs, which is determined by the speed of sound in the air. The value of the counter C thus represents the distance of the object based on the time that transducer elements receive the reflected ultrasound waves. After transmission of the ultrasound wave (or pulse), a minimum time period $T_W$ is allowed to elapse before measuring the amplitude of reflected waves. This allows for settling of the ultrasonic transducer detection system and ignores objects that are closer than the minimum detection range. Once $T_W$ has elapsed, the transducer controller measures the amplitudes A of the reflected waves received by the transducer elements at each time interval Δt for a duration of $T_R$ after the end of $T_W$. The measured amplitudes of reflective waves are then stored in memory—in particular, in an array indexed by the counter C, such that each array element, i.e., the data point, represents a measured amplitude A(t) at a specific time t related to a specific distance range in the current wave cycle. Each array element is then processed by the controller to determine locations and movements of the objects using a motion-detection algorithm, as described below. Once $T_R$ has elapsed, the transducer elements emit an ultrasound signal and the detection cycle is repeated. FIG. 3 depicts the iterative process of adaptively detecting movements of moving objects in real time. In one embodiment, this detection cycle is operated with a time interval of, e.g., 200 milliseconds or less between each signal to optimize the time resolution of detecting moving objects.

Figure 4:
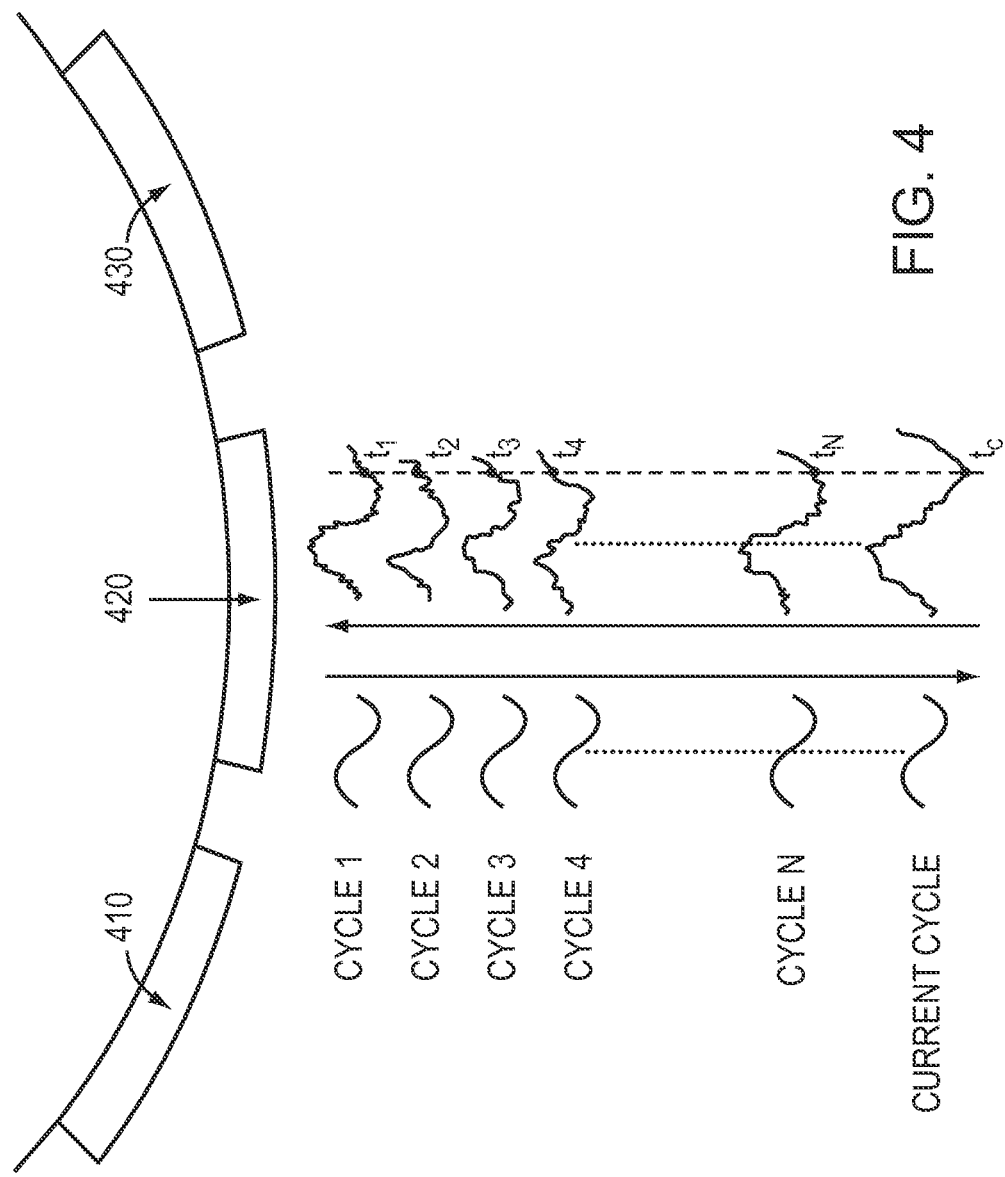
FIG. 4 depicts a method of calculating amplitude deviations.

Each transducer element is independent and has its own data set. The motion-detection algorithm is designed to process the data set and determine the movements of the objects while ignoring stationary objects. The algorithm may be optimized for minimum computational overhead, so that it can be executed in real time using a low-cost microcontroller. Additionally, the motion-detection algorithm may identify and report multiple moving objects at different distances (ranges) with different velocities (bearings). With reference to FIG. 4, the principle of the algorithm is that, for each point in time, an amplitude deviation of the current reflected wave cycle, e.g., $D(t_c)$, is calculated by subtracting the currently acquired amplitude $A(t_c)$ with a long-term average amplitude reading, $\overline{A}(t)$, from prior detection cycles—e.g., from cycle 1 to cycle N, $D(t_c)=A(t_c)-\overline{A}(t)$. The amplitudes of the reflected ultrasound waves from stationary objects may be treated as a static background; the amplitude deviations contributed from the stationary objects are thus negligible. By contrast, the amplitude deviations of moving objects are dynamic and may be further processed with the associated elapsed times received by the transducer elements to determine the range and bearing of the moving objects.

In some embodiments, the amplitude deviation is determined within the duration of an echo, where the start of the echo occurs when a reflected wave has an amplitude above a predetermined maximum intensity threshold and the end of the echo occurs when the amplitude is below a predetermined minimum intensity threshold. A long-term average amplitude $\overline{A}(t)$ of the echoes at a time t, within the echo duration, is then subtracted from the measured echo amplitude A(t) at the time t in the current reflective cycle to derive an amplitude deviation D(t) for the time t.

The durations and states of the echoes may be changed in some conditions. For example, if the amplitude deviation is smaller than a specific minimum threshold $D_{min}$ and the minimum echo duration has been exceeded, the echo state may be changed from "true," i.e. the echo exists, to "false," i.e., the echo no longer exists; in this case, the controller is ready to detect another echo. If an amplitude deviation is larger than a specific maximum threshold $D_{max}$, the echo state may be changed from "false" to "true"; in this case the range data is added to the array of detected echoes, and the echo count increases by one. In one embodiment, $D_{min}$ and $D_{max}$ are both predetermined values and can be adjusted based on, e.g., the long-term average amplitudes or the ranges of the detected objects, as further described below.

The long-term average amplitudes can be calculated utilizing any of several approaches, e.g., using a finite impulse response (FIR) filter or an infinite impulse response (IIR) filter. FIR filters have a fixed-duration impulse response; the long-term average amplitudes can be simply calculated from an average amplitude of N prior cycles, i.e., $$\overline{A}(t) = \frac{1}{N}(A(t_1) + A(t_2) + A(t_3) + \ldots + A(t_N)). \qquad (1)$$

However, this approach requires additional memory to store multiple sets of data from previous cycles; it thereby increases the cost of implementation. IIR filters have an impulse response function that is non-zero over an infinite length of time; the long-term average amplitudes are calculated using a one-out-of-N algorithm as:

$$\overline{A}(t) = \frac{1}{N}(\overline{A}(t_{N-1}) \times (N-1) + A(t_N)). \qquad (2)$$

At the end of each detection wave cycle, the long-term average amplitude may be updated utilizing eq. (2) to account for the measured echo amplitude in the current cycle. This approach provides an improved performance with lower memory usage and reduces the computational load. In one embodiment, the value of N is an integer power of 2; this allows the multiplication and division of integers to be replaced with left and right shift operations that are computationally less expensive.

In practice, the amplitude deviations from a spatial zone within a wave cycle based on the above definition may be noisy due to random variations of the amplitudes in the echo waves. Several approaches can be implemented for eliminating the random variations.

Figure 5:
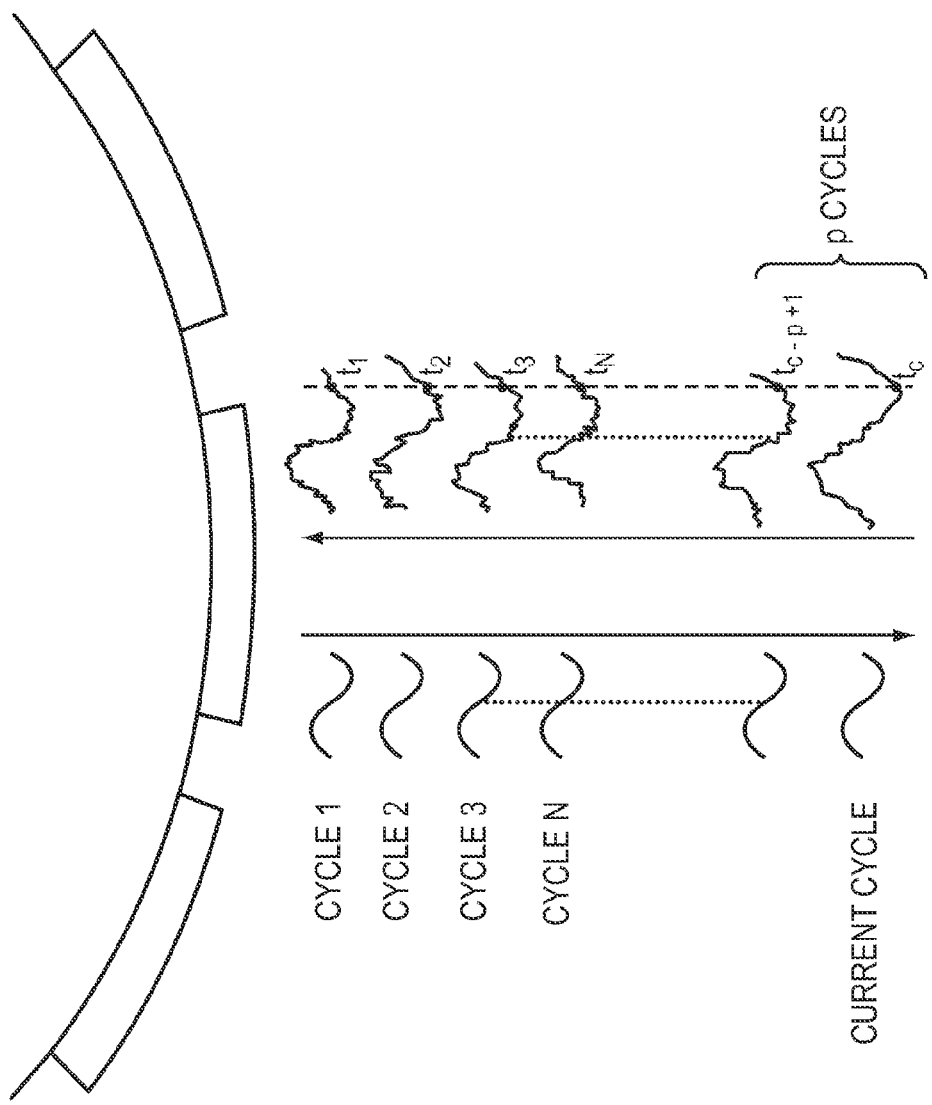
FIG. 5 depicts a method of calculating time-averaged amplitude deviations over multiple wave cycles.

In various embodiments, the time-averaged amplitude deviations can be used for eliminating random variations in the echo amplitudes; it is useful in a situation where moving objects move relatively slow compared with the emitted frequency of the wave cycles. FIG. 5 depicts an exemplary time-averaged amplitude deviation over P wave cycles:

$$\overline{D}_w(t_c) = \frac{1}{P}(D(t_{c-p+1}) + D(t_{c-p+2}) + D(t_{c-p+3}) + \ldots + D(t_c)). \qquad (4)$$

Figure 6:
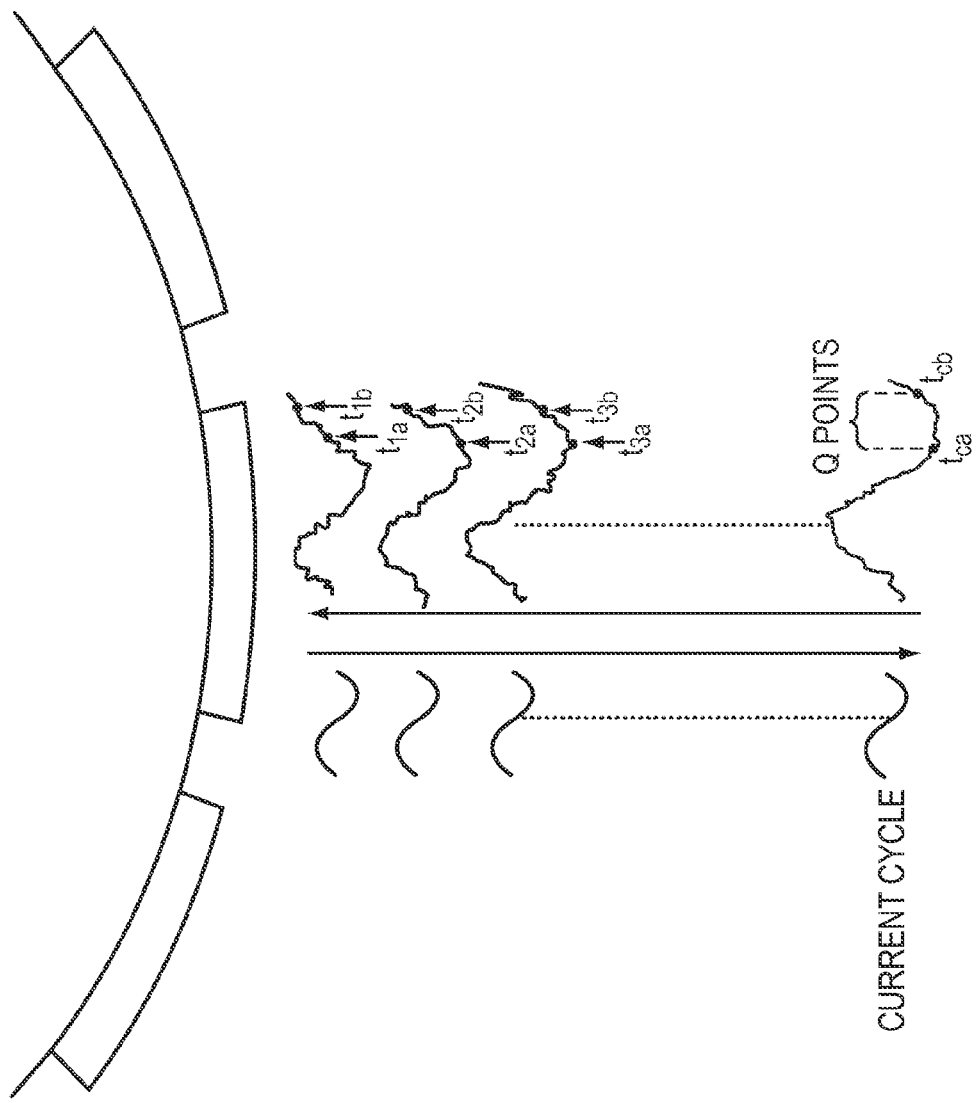
FIG. 6 depicts a method of calculating short-time averaged amplitude deviations over multiple successive times within a wave cycle.

In other embodiments, short time-averaged amplitude deviations can be used to reduce random variations of the echo amplitudes within a wave cycle. For example, with reference to FIG. 6, the short time-averaged amplitude deviation between time $t_{ca}$ and time $t_{cb}$ in the current cycle is given as:

$$\overline{D}_{st}(t_c) = \frac{1}{Q}(D(t_{ca}) + D(t_{ca+1}) + D(t_{ca+2}) + \ldots + D(t_{cb})), \qquad (5)$$

where Q is the number of data points received between time $t_{ca}$ to $t_{cb}$ within the current cycle.

Figure 7:
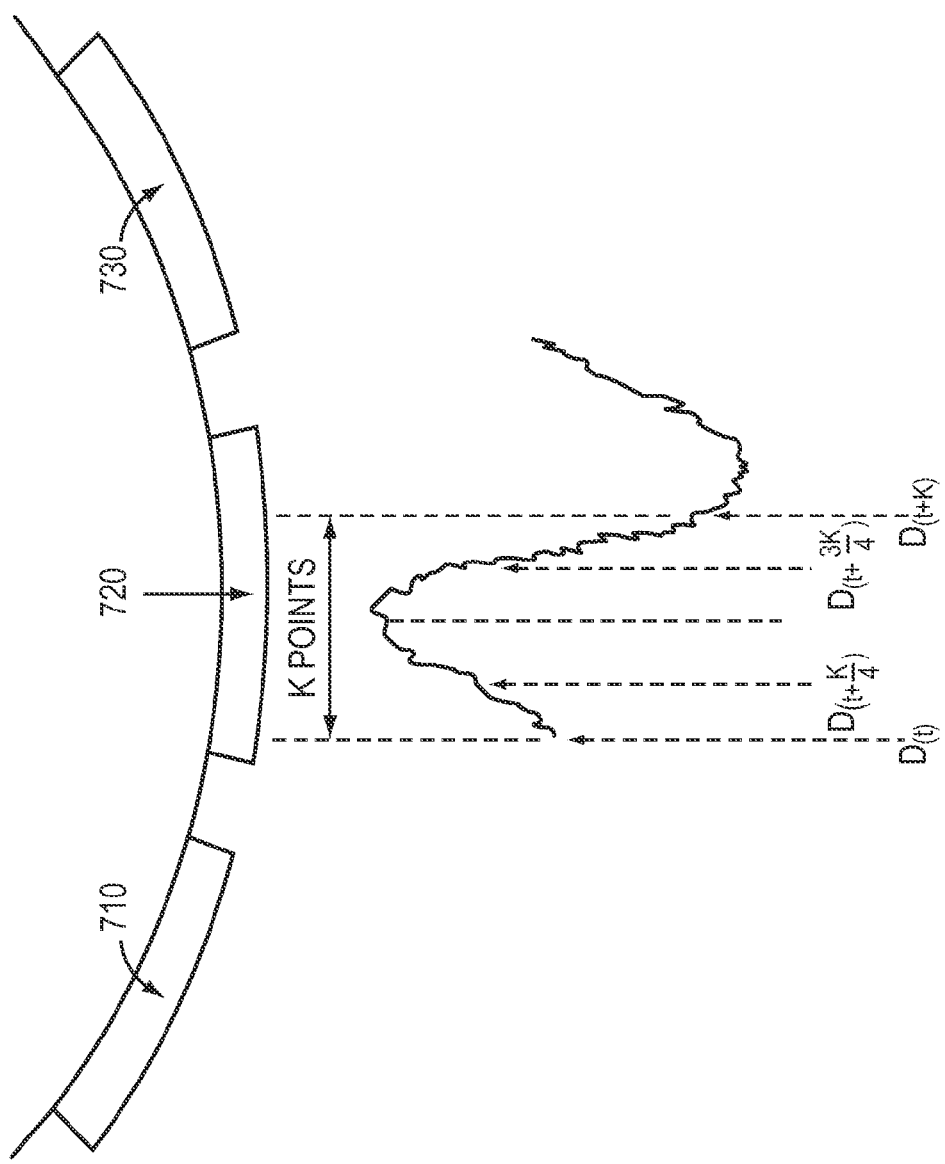
FIG. 7 depicts method of calculating peak-detected amplitude deviations within a wave cycle.
Figure 8:
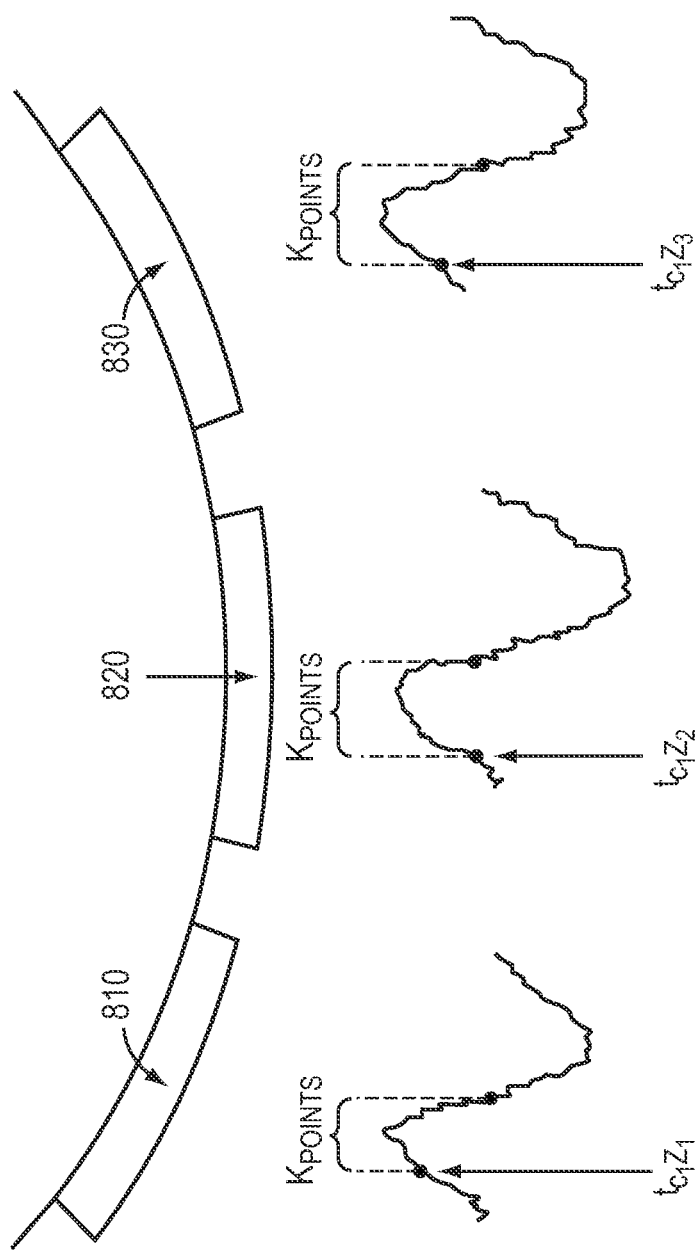
FIG. 8 depicts method of calculating the spatial average of peak-detected amplitude deviations within a wave cycle.

In various embodiments, the peak-detection algorithm is applied to improve the sensitivity of the detection algorithm to a steep rise in the amplitude deviation that is characteristic of the echo from an object of substantial size, e.g., a human. As depicted in FIG. 7, the peak-detection algorithm subtracts the amplitude deviations D(t) of the first K/4 data points from the total value and adds the last 3K/4 data points into the total value, as follows:

$$D_P(t+K) = \text{scale factor} \times \{(-1) \times [D(t) + D(t+1) + D(t+2) + \ldots + D(t+(K/4))] + [D(t+(K/4)+1) + D(t+(K/4)+2) + \ldots + D(t+K-1) + D(t+K)]\} \quad (6).$$

where $D_P(t+K)$ is the peak-detected amplitude deviation for time t+K, i.e., in the most recent K values of the amplitude deviation D(t) in the current wave cycle, as illustrated in FIG. 7. In one embodiment, as depicted in FIG. 8, movement detections of the objects can be determined based on an average of peak-detected amplitude deviations over adjacent spatial transducers (zones), e.g., 810, 820, and 830 in the current wave cycle; where $$\overline{D}_{p,z}(t+K) = \frac{1}{3}[\overline{D}(t_{c1z1} + K) + \overline{D}(t_{c1z2} + K) + \overline{D}(t_{c1z3} + K)]. \quad (7)$$

In various embodiments, $D_{min}$ and $D_{max}$, the predetermined minimum and maximum deviation thresholds, respectively, can be adjusted at each time t to reflect the various magnitude of the long-term average amplitude in various environments at time t. For example, $D_{min}$ and $D_{max}$ are set as low values when the detection waves are transmitted in a region with low amplitudes of reflected waves; it thus increases the sensitivity of the algorithm in determining the amplitude deviations as well as the duration of echoes. In regions where large random fluctuations of the amplitude deviations are expected even in the absence of moving objects, adjusting $D_{min}$ and $D_{max}$ accordingly increases the immunity of the detection algorithm to such fluctuations. $D_{min}$ and $D_{max}$ can also be adjusted to reflect the ranges of the detected objects. For example, for detecting more distant objects, $D_{min}$ and $D_{max}$ are set as low values in order to increase the sensitivity of the algorithm; as the objects approach the detectors, $D_{min}$ and $D_{max}$ may be adjusted to higher values since the amplitudes of reflected waves decay less significantly over a shorter distance.

The specific values used for $D_{min}$ and $D_{max}$ in a given system strongly depend on the electronic, acoustic, and software design parameters of the system, including, e.g., the sensitivity of the ultrasonic detectors, the gain and offset voltage of the amplifier chain, or the supply voltage used to operate the detector system. Therefore, systems with identical functional performance (e.g., range, detection sensitivity, noise immunity, or response speed) may have different predetermined values of $D_{min}$ and $D_{max}$ due to different components therein.

In an exemplary system with a gain of ~2000 for an amplifier chain, 12 bits of resolution for a microcontroller's analog-to-digital converter (ADC), and 3.3 V of the supply voltage, each ADC count represents about 805 μV at the ADC, or 0.4 μV of electrical signal from the transducer. In this system, values of $D_{max}$ can be in the range of 175 to 300, and values of $D_{min}$ at around 80. With the thresholds capable of dynamically adapting to the amplitude of the average, $D_{max}$ may be set as 300, 250, and 175 for high, moderate, and low average signals, respectively. Alternatively, with the thresholds dynamically adapted based on the ranges of the objects, the values of $D_{max}$ may be chosen as 300, 250, and 175 for close, intermediate, and long ranges, respectively.

Changing the acoustic environment of the transducer, e.g., changes in the ambient noise level at the ultrasonic frequencies to which the transducer elements are sensitive or the directions of the transducer elements, may result in false detection of moving objects. For example, when a noise source (e.g., a tool operated by compressed air) is switched on, the increased background signal level adds to the measured short-term amplitude deviation D(t), and can trigger false positive detections until the long-term average $\overline{A}(t)$ has adapted to the increased background level. Once the noise source to which the motion detector has adapted is switched off, the decreased background signal level may prevent detection of moving objects due to the decrease of all short-term amplitude deviations D(t) until the long-term average amplitude $\overline{A}(t)$ re-adapts. The adaptation of the long-term average amplitude to the new environment may take up to several wave cycles and thereby cause unexpected injuries to moving objects, e.g., humans in the environment. Movements of the transducer elements may also cause the measured short-term deviation D(t) to be erroneous, since the long-term average amplitudes $\overline{A}(t)$ of individual elements no longer reflect amplitudes of the echoes detected within the new field of view for each transducer element.

In various embodiments, detecting changes in the acoustic environment of the transducer elements can be implemented by tracking the integral of the measured amplitude deviations D(t) over time in each wave cycle. The integrated amplitude deviation, $I_{dev}$, can be calculated continuously for each transducer element with established maximum positive and negative thresholds. During a major change to the acoustic environment (e.g., the addition or removal of an ambient noise source, or rotation of the head of the transducer elements), $I_{dev}$ may have a large positive or negative value for some or all transducer elements. The motion-detecting algorithm, therefore, may be retrained to adapt to the new acoustic environment when the value of $I_{dev}$ exceeds either the positive or negative thresholds. Once the long-term amplitude average $\overline{A}(t)$ has adapted to the new acoustic environment, $I_{dev}$ may have a small value even in the presence of multiple moving objects due to their small short-term contributions. This approach minimizes a false detection resulting from changes in the environment.

While the motion detecting algorithm can be automatically and gradually adapted to a changed acoustic environment, adaptation may take a relatively long time. In one embodiment, adaptation is accelerated by suspending the normal motion detecting algorithm for a certain period, e.g., L cycles, and causing the detecting algorithm to rapidly retrain the new average amplitude $\overline{A}_{new}(t)$ as the average of the amplitudes A(t) measured during the retraining period, e.g., L cycles. $\overline{A}_{new}(t)$ is thus given as:

$$\overline{A}_{new}(t) = \frac{1}{L}(A_1(t) + A_2(t) + A_3(t) + \ldots + A_L(t)). \quad (8)$$

At the end of the retraining period (i.e., L cycles), the normal detecting algorithm resumes and the old amplitude average $\overline{A}(t)$ is replaced with the new amplitude average $\overline{A}_{new}(t)$, which is now accurately adapted to the new acoustic environment. In one embodiment, the adaption process can be automatically triggered for each transducer element when $I_{dev}$ of the transducer element exceeds a predetermined threshold. In another embodiment, all transducer elements together are subjected to the retraining process upon detecting $I_{dev}$ of a single transducer element and/or $I_{dev}$ of all transducer elements exceeding a predetermined threshold. This can be done at the transducer startup, and/or by external command, and/or automatically by the transducer in response to detecting major changes in its acoustic environment.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for providing a visual tracking indication to a moving observer, the method comprising:
   tracking, by a tracking device on a robot system comprising an appendage operative within a working envelope and which might cause danger to objects within the envelope, a location of the observer moving within a defined space relative to the robot system; and
   responsive to the tracked location, providing a visual tracking signal on the robot system continually visible to the moving observer within the space and varying with the tracked location relative to the robot system, the signal visually indicating, to the observer, a position of the observer relative to the robot system.

2. The method of claim 1, wherein the visual tracking signal is provided over a field covering at least 180° relative to the tracking device.

3. The method of claim 1, wherein the visual tracking signal is provided over a field covering 360° relative to the tracking device.

4. The method of claim 1, wherein the visual tracking signal is provided by an arcuate illumination device having an angularly variable illumination output, the illumination output being confined to a variable arcuate region continuously aligned with the tracked target.

5. The method of claim 4 wherein the arcuate illumination device has a closed ring configuration, the arcuate regions of available illumination extending fully around the ring.

6. The method of claim 4, wherein the arcuate illumination device comprises a plurality of individually actuable segments of the arcuate illumination device, the segments being variably actuated as the target moves to maintain the alignment.

7. The method of claim 1, further comprising:
   tracking, by the tracking device, a location of a second target object moving within the defined space; and
   responsive to the tracked location of the second target object, providing a second visual tracking signal continually visible to the moving second target object within the space and varying with the tracked location of the second target object, the second signal visually indicating the tracked location of the second target object relative to the tracking device.

8. A system for tracking movement, the system comprising:
   a robot system comprising an appendage operative within a working envelope and which might cause danger to objects within the envelope;
   a robot controller on the robot system;
   a tracking system on the robot system for tracking a location of an observer moving within a defined space relative to the robot system;
   an illumination device having an arcuate profile and an angularly variable illumination output; and
   an illumination controller, responsive to the tracking system, for controlling the illumination device to provide a visual tracking signal continually visible to the moving observer within the space and varying with the tracked location relative to the robot system, the signal visually indicating, to the observer, a position of the observer relative to the robot system.

9. The system of claim 8 wherein the tracking system comprises an ultrasound transducer comprising a plurality of transducer elements, each element emitting and receiving ultrasound with a spatial zone defined by a solid angle;
   drive circuitry coupled to the transducer elements; and
   an ultrasound controller for controlling ultrasound waves emitted from the transducer elements and determining movements of objects based thereon, the illumination controller causing the illumination device to output light to the spatial zone in which the target is located.

10. The system of claim 9, wherein the illumination device comprises a plurality of individually actuable segments each corresponding to one of the spatial zones, the segments being variably actuated as the target moves so that at least the segment corresponding to the spatial zone in which the target is instantaneously located is lit.

11. The system of claim 10, wherein the transducer elements and the illumination segments are arranged in a ring.

12. The system of claim 8, wherein the field covers at least 180° relative to the tracking device.

13. The system of claim 8, wherein the field covers 360° relative to the tracking device.

14. The system of claim 8, wherein the illumination device has an angularly variable illumination output, the controller causing the visual signal to be confined to a variable arcuate region continuously aligned with the tracked target.

15. The system of claim 8, wherein the illumination device has a closed ring configuration, the angularly variable illumination output extending fully around the ring.

16. The system of claim 8, wherein the illumination device comprises a plurality of individually actuable segments, the controller variably actuating the segments as the target moves to maintain the alignment.

17. The system of claim 8, wherein:
   the tracking system is configured to track a location of a second target object moving within the defined space; and
   the illumination controller is responsive to the tracked location of the second target object and controls the illumination device to provide a second visual tracking signal continually visible to the moving second target object within the space and varying with the tracked location of the second target object, the second signal visually indicating the tracked location of the second target object relative to the tracking device.

* * * * *